(12) United States Patent
Molisch et al.

(10) Patent No.: US 7,359,470 B2
(45) Date of Patent: Apr. 15, 2008

(54) MINIMIZING FEEDBACK RATE FOR CHANNEL STATE INFORMATION IN MIMO SYSTEMS

(75) Inventors: Andreas F. Molisch, Arlington, MA (US); Jianxuan Du, Atlanta, GA (US); Ye Li, Marietta, GA (US); Daqing Gu, Burlington, MA (US); Jinyun Zhang, Cambridge, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 648 days.

(21) Appl. No.: 10/939,284

(22) Filed: Sep. 10, 2004

(65) Prior Publication Data

US 2006/0056533 A1    Mar. 16, 2006

(51) Int. Cl.
*H04L 7/02* (2006.01)
(52) U.S. Cl. .................................. 375/358
(58) Field of Classification Search ............ 375/259, 375/260, 267, 299, 358; 708/179, 426, 806; 455/69
See application file for complete search history.

(56) References Cited

U.S. PATENT DOCUMENTS 6,154,499 A * 11/2000 Bhaskar et al. ......... 375/259
6,990,137 B2 * 1/2006 Smee et al. ............... 375/142
2003/0081703 A1 * 5/2003 Kawaguchi et al. ...... 375/343
2005/0195889 A1 * 9/2005 Grant et al. .............. 375/148
2006/0023653 A1 * 2/2006 Montalbano .............. 370/315

OTHER PUBLICATIONS

E. Telatar, "Capacity of multi-antenna Gaussian channels," *European Transactions on Telecommunications*, vol. 10, pp. 585-595, Nov.-Dec. 1999.
G. J. Foschini and M. J. Gans, "On the limits of wireless communications in a fading environment when using multiple antennas," *Wireless Personal Commun.*, vol. 6, pp. 315-335, Mar. 1998.

* cited by examiner

*Primary Examiner*—Sam K. Ahn
(74) *Attorney, Agent, or Firm*—Dirk Brinkman; Clifton D. Mueller; Gene V. Vinokur

(57) ABSTRACT

A method minimizes a rate for feeding back channel state information from a receiver to a transmitter in a multi-input, multi-output communications systems. A temporal autocorrelation function of the channel between the transmitter and the receiver is determined. A spatial covariance information is estimated of the channel. Then, the minimum rate for feeding back channel state information from the receiver to the transmitter is based on actual channel state information and the estimated spatial covariance information and the temporal autocorrelation function.

13 Claims, 1 Drawing Sheet

100

MINIMIZING FEEDBACK RATE FOR CHANNEL STATE INFORMATION IN MIMO SYSTEMS

FIELD OF THE INVENTION

This invention relates generally to multi-input, multi-output communications systems, and more particularly to estimating a rate for feeding back channel state information in such systems.

BACKGROUND OF THE INVENTION

Multiple transmit and receive antennas can greatly increase the efficiency of wireless communication systems, E. Telatar, "Capacity of multi-antenna Gaussian channels," European Transactions on Telecommunications, vol. 10, pp. 585-595, November-December 1999, G. J. Foschini and M. J. Gans, "On the limits of wireless communications in a fading environment when using multiple antennas," Wireless Personal Communication, vol. 6, pp. 315-335, March 1998. When channel state information (CSI) is known at the transmitter in a MIMO system, singular value decomposition (SVD) transmission with water-filling can be used to approach channel capacity, see Telatar.

However, channel estimation error and CSI feedback delay in time-varying channels cause CSI ambiguity at the transmitter. The loss of orthogonality between virtual channels formed by SVD causes mutual interference and significantly degrades system performance.

For many systems, perfect instantaneous CSI at the transmitter (CSIT) is not possible. For frequency division duplex (FDD) systems, in which the forward and the reverse links operate at different frequencies, instantaneous CSIT would require continuous fast feedback, possibly in a separate feedback channel, which decreases the spectral efficiency. For time division duplex (TDD) systems, in which the forward and reverse links operate at the same frequency, instantaneous CSIT is impossible, especially if the system operates in channels with small coherence intervals. Perfect CSIT requires zero delays between the forward and reverse links.

Prior art MIMO systems provide feedback of the CSI at a fixed rate, e.g., 3 GPP provides channel state feedback every 10 ms. It is desired to provide the CSI at a minimum rate, while still meeting predetermined performance criteria.

SUMMARY OF THE INVENTION

The invention provides a system and method for determining a minimum rate of feedback of channel state information (CSI) in a multiple-input multiple-output (MIMO) systems. The system uses a singular value decomposition (SVD) so that channel capacity, compared to ideal instantaneous feedback of CSI, at all times, stays within a predetermined bound. With the method according to the invention, a minimum rate of channel feedback for each particular channel realization is determined adaptively.

The invention uses channel spatial covariance information to determine the minimum rate. This information, in terms of small scale averaged statistics, can be determined by spatial parameters, such as angular spread and mean angles of arrival. The spatial covariance is the same for the forward link and the reverse links, even in FDD or quickly varying TDD systems. The spatial covariance information is used to decrease the rate of CSI feedback.

It is an object of the invention to minimize the rate for feeding back CSI. Uncertainty in the CSI leads to a finite probability of outage, i.e., block errors, for a given outage probability. The invention determines a minimum feedback rate.

DETAILED DESCRIPTION OF THE PREFERRED EMBODIMENT

System Structure and Method Operation

Figure 1:
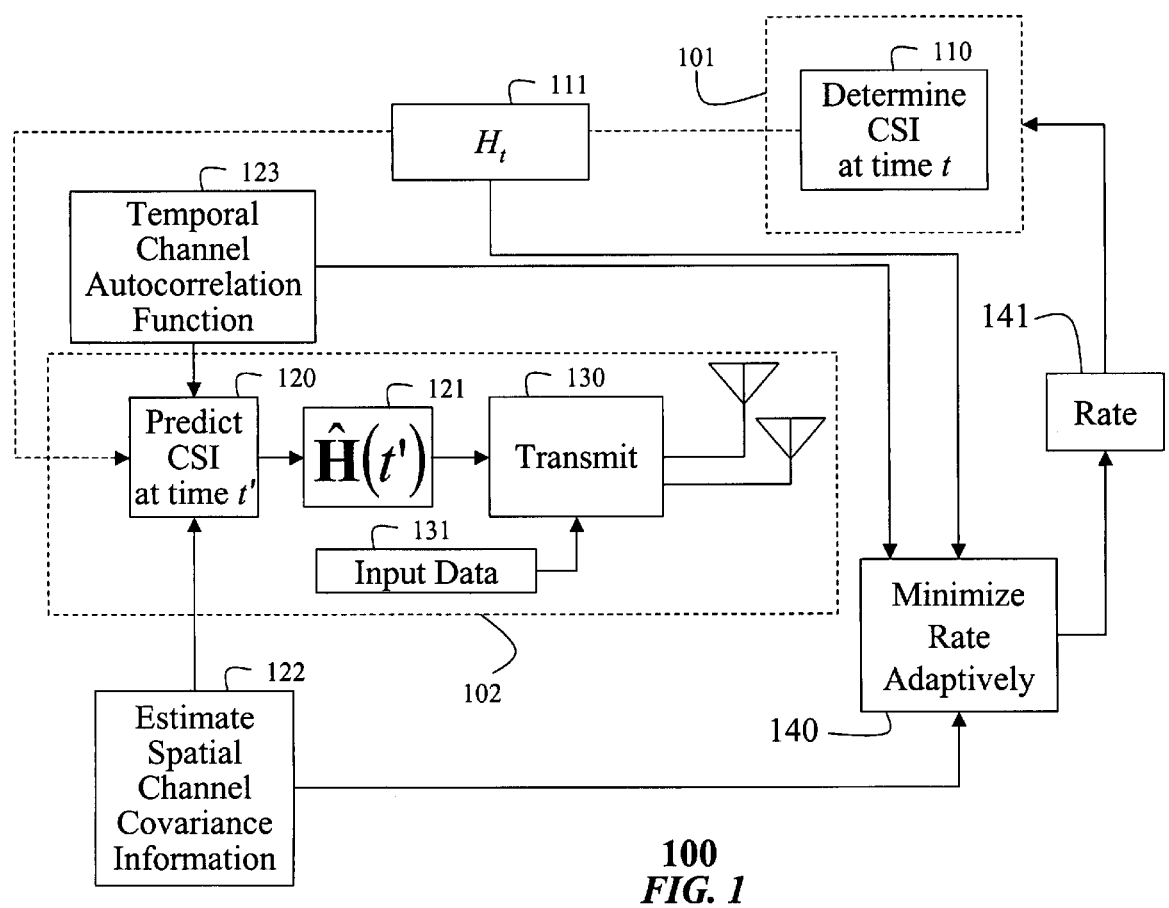
FIG. 1 is a block diagram of a system and method according to the invention.

Latency of available channel state information (CSI) at a transmitter in time-varying channels greatly affects the performance of multi-input, multi-output (MIMO) systems. We describe a method that provides feedback at an adaptive minimum rate. The minimum rate is selected such that a performance loss, compared to ideal and instantaneous feedback at all times, is within prescribed limits.

We also provide a method for estimating an expected performance loss based on the most recent feedback of the CSI. The invention can be used to determine the minimum channel feedback rate for each particular channel realization.

As shown in FIG. 1, the method and system 100 according to the invention includes the following components and steps. At a receiver 101, actual channel state information (CSI) H(t) 111 is determined 110. The CSI 111 can include information about the reliability of the channel, i.e., quantization errors and signal-to-interference-plus-noise (SNIR). The determination of the CSI 111 can be at regular intervals. The feedback of the CSI 111 is at a rate determined according to the invention.

At the transmitter 102, the CSI for a new time instant t', $\hat{H}(t')$ 121, is estimated 120 from the CSI H(t) 111 and an estimate of channel spatial covariance information 122 using a channel temporal autocorrelation function $r(\Delta t)|_{\Delta t = t' - t}$ 123. The function 123 is based on the Doppler spectrum, permissible performance degradation, and a percentage of time that the performance degradation has to stay below a permitted degradation.

The transmitter 102 transmits 130 input data 131 based on an SVD decomposition of $\hat{H}(t')$ 121 and a waterfilling method.

The receiver 101 feeds back the CSI 111 at a rate 141 based on the CSI H(t) 111, the channel spatial covariance information, and the temporal function $r(\Delta t)|_{\Delta t = t' - t}$ 123.

It should be noted that the rate, the channel spatial covariance information and the channel temporal autocorrelation function $r(\Delta t)|_{\Delta t = t' - t}$ can be determined at either the receiver 101 or the transmitter 102.

Our method estimates expected capacity loss for each instantaneous channel realization based on the channel autocorrelation. In one particular embodiment, described in the next section, by approximating a weighted sum of a number of chi-square random variables with another chi-square random variable with different degrees of freedom, which have the same first two moments, we are able to derive a simple closed form expression for the expected capacity with the current CSI and power allocation.

Problem Formulation

For a MIMO system with $N_t$ transmit and $N_r$ receive antennas, the signal received at each antenna is a superposition of distorted signals from $N_t$ transmit antennas.

$$y_k(t) = \sum_{k=1} h_{kl}(t)x_l(t) + n_k(t), k = 1, 2, \ldots, N_r,$$

where $h_{kl}(t)$ is a channel gain corresponding to transmit antenna $l$ and receive antenna k at time t. The gain is assumed to be independent and identically distributed (i.i.d.) complex Gaussian random variable and have the same temporal autocorrelation function $r(\Delta t)$. An additive white complex Gaussian noise at receive antenna k is $n_k(t)$. The noise is assumed to be zero-mean with variance $N_0$ and independent for different receive antennas k's and at different times t's.

The channel state information (CSI) at time t can be represented by a channel matrix $$H(t) = \begin{pmatrix} h_{11}(t) & h_{12}(t) & \cdots & h_{1N_t}(t) \\ h_{21}(t) & h_{22}(t) & \cdots & h_{2N_t}(t) \\ \vdots & \vdots & \ddots & \vdots \\ h_{N_r1}(t) & h_{N_r2}(t) & \cdots & h_{N_rN_t}(t) \end{pmatrix}.$$

With the CSI at the transmitter, linear pre-processing at the transmitter 102 and post-processing at the receiver 101 can be used to decouple the MIMO channel into a number of parallel single-input single-output (SISO) channels.

If the SVD of the CSI H(t) is $H(t)=U(t)\Sigma(t)V^H(t)$, then the received signal using SVD technique becomes $$y(t)=U^H(t)[H(t)V(t)s(t)+n(t)]=\Sigma(t)s(t)+\tilde{n}(t),$$

where $\Sigma(t)$ is a diagonal matrix.

For transmitting, optimum power allocation using water-filling according to the diagonal elements of $\Sigma(t)$ is described by T. M. Cover and J. A. Thomas, Elements of Information Theory. New York: Wiley, 1991.

Due to time-varying channel and insufficient frequency of feedback, the channel state information available at the time of transmission is different from the actual CSI at the transmitter.

If the actual CSI feed back to the transmitter 102 is H(t) 111, then the CSI at time t' is $H(t')=\hat{H}(t')+\Delta H(t')$, where $\hat{H}(t')$ 121 is a channel response at time t' predicted from H(t) 111, and $\Delta H(t')$ is a prediction error matrix.

If $\hat{U}(t')\hat{\Sigma}(t')\hat{V}^H(t')$ is the SVD of $\hat{H}(t')$, then the received signal vector at the receiver after the SVD processing becomes $$\tilde{y}(t')=\hat{U}^H(t')[H(t')\hat{V}(t')s(t')+n(t')]=(\hat{\Sigma}(t')+\Delta\Sigma(t'))s(t')+\tilde{n}(t'),$$

where $$\Delta\sum(t') = \hat{U}^H(t')H(t')\hat{V}(t') = \begin{pmatrix} \delta_{11}(t') & \delta_{12}(t') & \cdots & \delta_{1N_t}(t') \\ \delta_{21}(t') & \delta_{22}(t') & \cdots & \delta_{2N_t}(t') \\ \vdots & \vdots & \ddots & \vdots \\ \delta_{N_r1}(t') & \delta_{N_r2}(t') & \cdots & \delta_{N_rN_t}(t') \end{pmatrix}. \quad (1)$$

From Equation (1), the term $\Delta\Sigma(t')$ causes mutual interference between supposedly decoupled virtual channels. The term $\tilde{n}(t')=\hat{U}^H(t')n(t')$ is the noise vector after unitary transformation. The noise vector has the same distribution as n(t') because the i.i.d. Gaussian distribution is invariant to unitary transformation. For simplicity, we assume $N_t=N_r=M$ and extension to systems with different numbers of transmit and receive antennas is straightforward.

A joint distribution of channel parameters at times t and t' is characterized by the channel temporal autocorrelation function $r(\Delta t)|_{\Delta t=t'-t}$. The terms $s\delta_{kl}(t,t')$ for the minimum mean-square error (MMSE) prediction are i.i.d. complex Gaussian, S. M. Kay, Fundamentals of Statistical Signal Processing: Estimation Theory. Upper Saddle River, N.J.: Prentice-Hall, Inc., 1993. The terms satisfy $$\delta_{kl}(t,t') \sim CN(0,\eta^2),$$

where $\eta^2=r(0)-|r(t'-t)|^2/r(0)$, and $CN(m,\eta^2)$ denotes a complex Gaussian random variable with a mean m and a variance $\eta^2$. The symbol '~' means both sides have the same distribution. From now on, we drop the time index for simplicity.

We determine the channel capacity with CSI ambiguity due to channel variation. Note that we assume complete decoupling of all virtual channels. Therefore, joint decoding is not required, and the capacity is the sum of all the channels in the presence of mutual interference. Thus, the channel capacity averaged over all possible value of $\Delta\Sigma(t')$ is $$E_{\delta_{lk}}\left\{\sum_{l=1}^{M} \log_2\left(1 + \frac{A_l^2|\alpha_l + \delta_{ll}|^2}{\sum_{k \neq l} A_k^2|\delta_{lk}|^2 + N_0}\right)\right\} = \quad (2)$$

$$E_{\delta_{lk}}\left\{\sum_{l=1}^{M} \log_2\left(A_l^2|\alpha_l + \delta_{ll}|^2 + \sum_{k \neq l} A_k^2|\delta_{lk}|^2 + N_0\right)\right\} -$$

$$E_{\delta_{lk}}\left\{\sum_{l=1}^{M} \log_2\left(\sum_{k \neq l} A_k^2|\delta_{lk}|^2 + N_0\right)\right\}$$

where $E_x\{\cdot\}$ denotes an expectation with respect to random variable x, and $\alpha_l$'s are the diagonal elements of $\hat{\Sigma}(t')$. The amplitude $A_l$ of signal sent using the virtual channel corresponding to $\alpha_l$ is determined by water-filling from $\alpha_l$'s, see Cover et al.

Estimation of Channel Capacity with CSI Ambiguity

There is no known closed form expression for the average channel capacity in Equation (2). Direct evaluation requires numerical integration. Instead, we estimate an average capacity. Note that $$A_l^2|\alpha_l + \delta_{ll}|^2 + \sum_{k \neq l} A_k^2|\delta_{lk}|^2 + N_0$$

is a weighted sum of chi-square random variables. We approximate the distribution by another chi-square random variable with different degrees of freedom so that $$|\alpha_l + \delta_{ll}|^2 \sim \frac{\eta^2}{2}\chi^2\left(2, \frac{2|\alpha_l|^2}{\eta^2}\right),$$

where $\chi^2(m,q)$ represents a non-central chi-square random variable with m degrees of freedom and non-centrality parameter q. In particular, $\chi^2(m,0)$ is written as $\chi^2(m)$.

We make the following approximation, $$\frac{\eta^2 A_l^2}{2} \chi^2\left(2, \frac{2|\alpha_l|^2}{\eta^2}\right) + \sum_{k \neq l} \frac{\eta^2 A_k^2}{2} \chi^2(2) + N_0 \approx \beta_l \chi^2(d_l),$$

where $\beta_l$ and $d_l$ are selected such that both sides have the same mean and variance, i.e., $$A_l^2 |\alpha_l|^2 + \eta^2 \sum_{k=1}^{M} A_k^2 + N_0 = \beta_l d_l \text{ and}$$

$$2A_l^4 \eta^2 |\alpha_l|^2 + \eta^4 \sum_{k=1}^{M} A_k^4 = 2\beta_l^2 d_l. \text{ Then}$$

$$\beta_l = \frac{2A_l^4 \eta^2 |\alpha_l|^2 + \eta^4 \sum_{k=1}^{M} A_k^4}{2\left(A_l^2 |\alpha_l|^2 + \eta^2 \sum_{k=1}^{M} A_k^2 + N_0\right)}, \text{ and} \quad (3)$$

$$d_l = \frac{2\left(A_l^2 |\alpha_l|^2 + \eta^2 \sum_{k=1}^{M} A_k^2 + N_0\right)^2}{2A_l^4 \eta^2 |\alpha_l|^2 + \eta^4 \sum_{k=1}^{M} A_k^4}. \text{ Thus,} \quad (4)$$

$$E_{\delta_{lk}}\left\{\sum_{l=1}^{M} \log_2\left(A_l^2 |\alpha_l + \delta_{ll}|^2 + \sum_{k \neq l} A_k^2 |\delta_{lk}|^2 + N_0\right)\right\} \approx \quad (5)$$

$$\log_2(\beta_l) + \int_0^{\infty} \frac{1}{2^{d_l/2} \Gamma(d_l/2)} \log_2(u) u^{d_l/2-1} e^{-u/2} du =$$

$$\log_2(\beta_l) + \frac{1}{2^{d_l/2} \Gamma(d_l/2)} \frac{\Gamma(d_l/2)[\psi(d_l/2) + \ln 2]}{(1/2)^{d_l/2} \ln 2} =$$

$$\log_2(\beta_l) + \frac{\psi(d_l/2)}{\ln 2} + 1,$$

where $\Gamma(x) = \int_0^{\infty} u^{x-1} e^{-u} du$ is the gamma function, and $$\psi(x) = \frac{d}{dx} \ln \Gamma(x)$$

is known as digamma function or psi function. Similarly, we find $\beta_l'$ and $d_l'$ for $\Sigma_{k \neq l} A_k^2 |\delta_{lk}|^2 + N_0$. Therefore, the approximate average capacity is $$E_{\delta_{lk}}\left\{\sum_{l=1}^{M} \log_2\left(1 + \frac{A_l^2 |\alpha_l + \delta_{ll}|^2}{\Sigma_{k \neq l} A_k^2 |\delta_{lk}|^2 + N_0}\right)\right\} \approx \quad (6)$$

$$\sum_{l=1}^{M} \log_2\left[\frac{\beta_l}{\beta_l'} + \frac{\psi(d_l/2) - \psi(d_l'/2)}{\ln 2}\right].$$

From Equation (6), the maximum tolerable channel feedback delay is determined 140 by finding the maximum time $\Delta t_{max}$ such that for all $\Delta t \leq \Delta t_{max}$ the expected capacity is greater than a predetermined threshold.

The derived maximum tolerable channel feedback delay can be used to adaptively adjust the feedback rate 141 for each instantaneous channel realization. The rate 141 can also be used as an indicator for switching to another transmission mode that is less sensitive to ambiguity in channel knowledge.

Extension to Frequency-Selective Channels

Now, we consider systems with frequency-selective fading. The channel impulse response at frequency f becomes $$h_{kl}(t, f) = \sum_m \alpha_{klm}(t) e^{-j2\pi f \tau_l},$$

where the terms $\alpha_{klm}(t)$ are wide-sense stationary narrow band complex Gaussian processes. The Gaussian processes are independent for different paths and different receive antennas k's and different transmit antennas l's. We assume that the terms $\alpha_{klm}(t)$'s have the same normalized correlation function and that $$\sum_m E\{|\alpha_{klm}(t)|^2\} = r(0).$$

Thus, the channel response and the mutual interference between virtual channels varies with frequency. Similar to the flat-fading case, we now denote the power spectral density of the mutual interference as $\delta_{kl}(t,t',f)$ at the frequency f.

The terms $\delta_{kl}(t,t',f)$ have the same distribution and are correlated across frequency. However, due to the linearity of expectation, the correlation does not affect the total average capacity when added up over frequency. Therefore, we can obtain the approximate average capacity derived in the previous section for each subcarrier, and then obtain the sum total to estimate the overall capacity loss, i.e., $$E_{\delta_{lk}(f)}\left\{\int \sum_{l=1}^{M} \log_2\left(1 + \frac{A_l^2(f)|\alpha_l(f) + \delta_{ll}(f)|^2}{\Sigma_{k \neq l} A_k^2(f)|\delta_{lk}(f)^2| + N_0}\right) df\right\} \approx \quad (7)$$

$$\int \sum_{l=1}^{M} \sum_{l=1}^{M} \left[\log_2 \frac{\beta_l(f)}{\beta_l'(f)} + \frac{\psi(d_l(f)/2) - \psi(d_l'(f)/2)}{\ln 2}\right] df.$$

Here we apply Equation (3) and (4) to derive $\beta_l(f)$, $\beta_l'(f)$, $d_l(f)$, and $d_l'(f)$ at each frequency f. Note that in this case, $A_l(f)$'s, $\alpha_l(f)$'s, $\delta_l(f)$, and $N_0$ are power spectral densities.

This problem is in general hard to solve. As an approximation, we divide the entire bandwidth into small bands and treat the frequency response within each band as a constant, as is done for a system that uses orthogonal frequency division multiplexing (OFDM). Then, Equation (7) becomes a finite sum.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for minimizing a rate for feeding back channel state information from a receiver to a transmitter in a multi-input, multi-output communications system, comprising:
   determining channel state information of a channel between the transmitter and the receiver;
   determining a temporal autocorrelation function of the channel between the transmitter and the receiver;
   estimating spatial covariance information of the channel; and
   determining a minimum rate for feeding back the channel state information from the receiver to the transmitter based on the channel state information and the spatial covariance information and the temporal autocorrelation function.

2. The method of claim 1, in which the rate is adapted over time.

3. The method of claim 1, in which the rate is adapted to maximize a capacity of a channel between the transmitter and the receiver.

4. The method of claim 3, in which the channel is frequency-selective.

5. The method of claim 1, further comprising:
   estimating an expected performance based on a most recent feedback of the channel state information.

6. The method of claim 1, in which the channel state information includes quantization errors and signal-to-interference-plus-noise.

7. The method of claim 1, in which the channel state information is determined at regular intervals.

8. The method of claim 1, in which the channel state information is determined in the receiver.

9. The method of claim 1, in which the temporal autocorrelation function is based on a Doppler spectrum of the channel, permissible performance degradation, and a percentage of time that the performance degradation has to stay below a permitted degradation.

10. The method of claim 1, in which the determining of the temporal autocorrelation function and the estimating of the spatial covariance information is performed in the transmitter.

11. The method of claim 1, in which the determining of the temporal autocorrelation function and the estimating of the spatial covariance information is performed in the receiver.

12. The method of claim 1, in which the channel state information at a time t is represented by a channel matrix $$H(t) = \begin{pmatrix} h_{11}(t) & h_{12}(t) & \cdots & h_{1N_t}(t) \\ h_{21}(t) & h_{22}(t) & \cdots & h_{2N_t}(t) \\ \vdots & \vdots & \ddots & \vdots \\ h_{N_r 1}(t) & h_{N_r 2}(t) & \cdots & h_{N_r N_t}(t) \end{pmatrix},$$

where $h_{kl}(t)$ is a channel gain corresponding to transmit antenna l and receive antenna k at time t.

13. A system for minimizing a rate for feeding back channel state information in a multi-input, multi-output communications system, comprising:
   a receiver configured to determine channel state information of a channel between the receiver and a transmitter;
   means for determining a temporal autocorrelation function of the channel between the transmitter and the receiver;
   means for estimating spatial covariance information of the channel; and
   means for determining a minimum rate for feeding back the channel state information from the receiver to the transmitter based on the channel state information and the spatial covariance information and the temporal autocorrelation function.

* * * * *